United States Patent [19]

Mangone, Jr.

[11] Patent Number: 4,801,061
[45] Date of Patent: Jan. 31, 1989

[54] CABLE MOUNTING APPARATUS AND METHOD

[76] Inventor: Peter G. Mangone, Jr., 28600 Buchanan Dr., Evergreen, Colo. 80439

[21] Appl. No.: 861,778

[22] Filed: May 15, 1986

Related U.S. Application Data

[63] Continuation-in-part of Ser. No. 740,802, Jun. 3, 1985, and a continuation-in-part of Ser. No. 754,574, Jul. 15, 1985.

[51] Int. Cl.⁴ .......................... B27F 7/00; F16B 15/08
[52] U.S. Cl. .................................... 227/120; 227/135; 227/146; 227/147; 248/71; 411/442; 411/445
[58] Field of Search ............... 227/120, 135, 146, 147; 248/71, 74.5; 411/442–445, 908

[56] References Cited

FOREIGN PATENT DOCUMENTS

| 1366144 | 6/1964 | France | 206/340 |
| 2035601 | 12/1970 | France . | |
| 0797766 | 7/1958 | United Kingdom | 206/341 |
| 1554602 | 10/1979 | United Kingdom . | |

Primary Examiner—Carl E. Hall
Assistant Examiner—Taylor J. Ross
Attorney, Agent, or Firm—Klaas & Law

[57] ABSTRACT

A system for fastening cable to a support system using an insulated, protective housing that has surface penetrating fastening devices mounted thereon in such a manner so as to allow a multiplicity of housings to be positioned, discharged and applied in a uniform automated process. The applicator has a base plate with a slot that cooperates to position the housings slightly above the support surface with a portion of the cable passing through the slot.

18 Claims, 5 Drawing Sheets

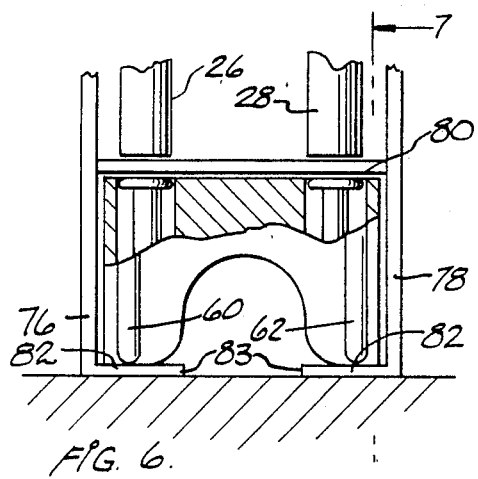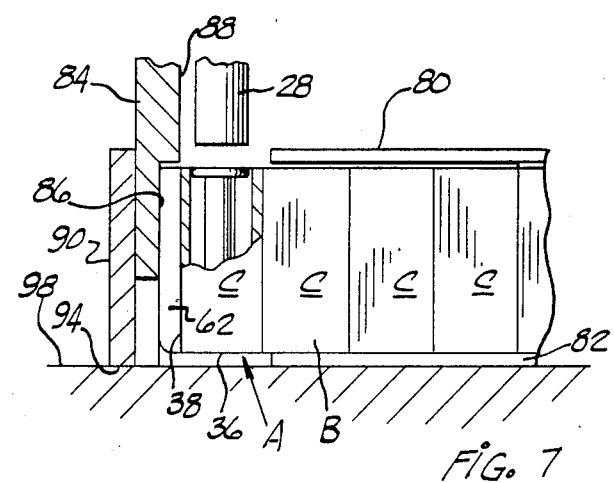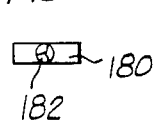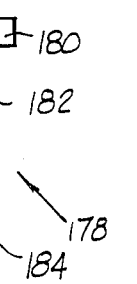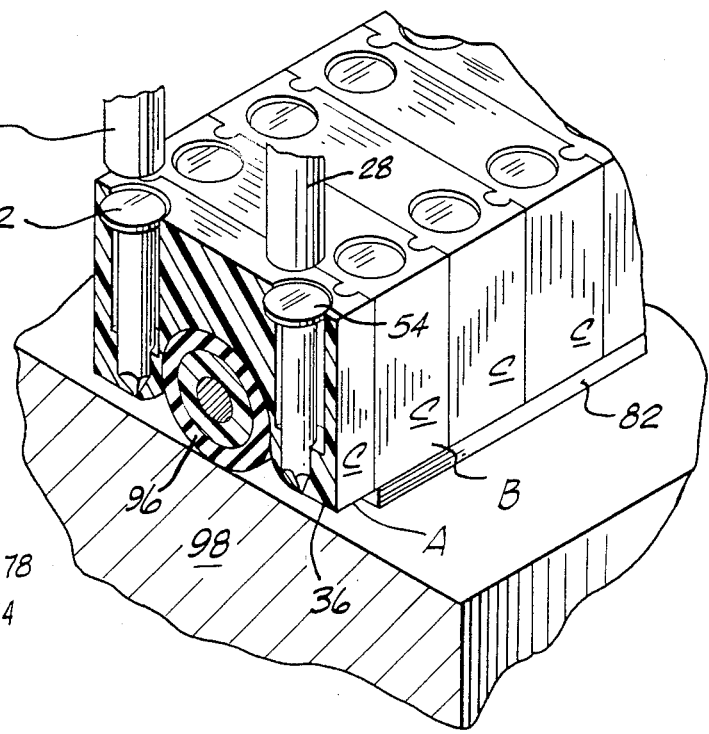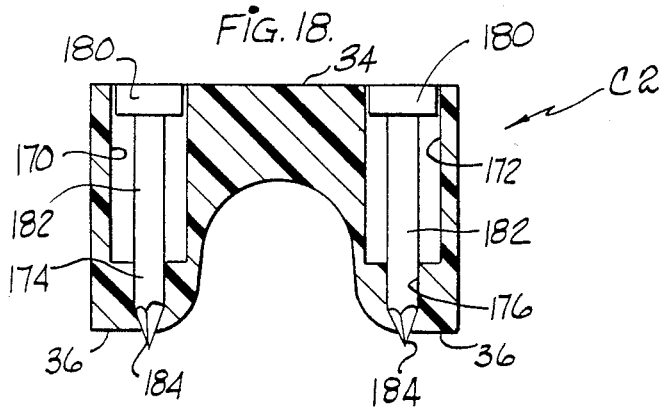

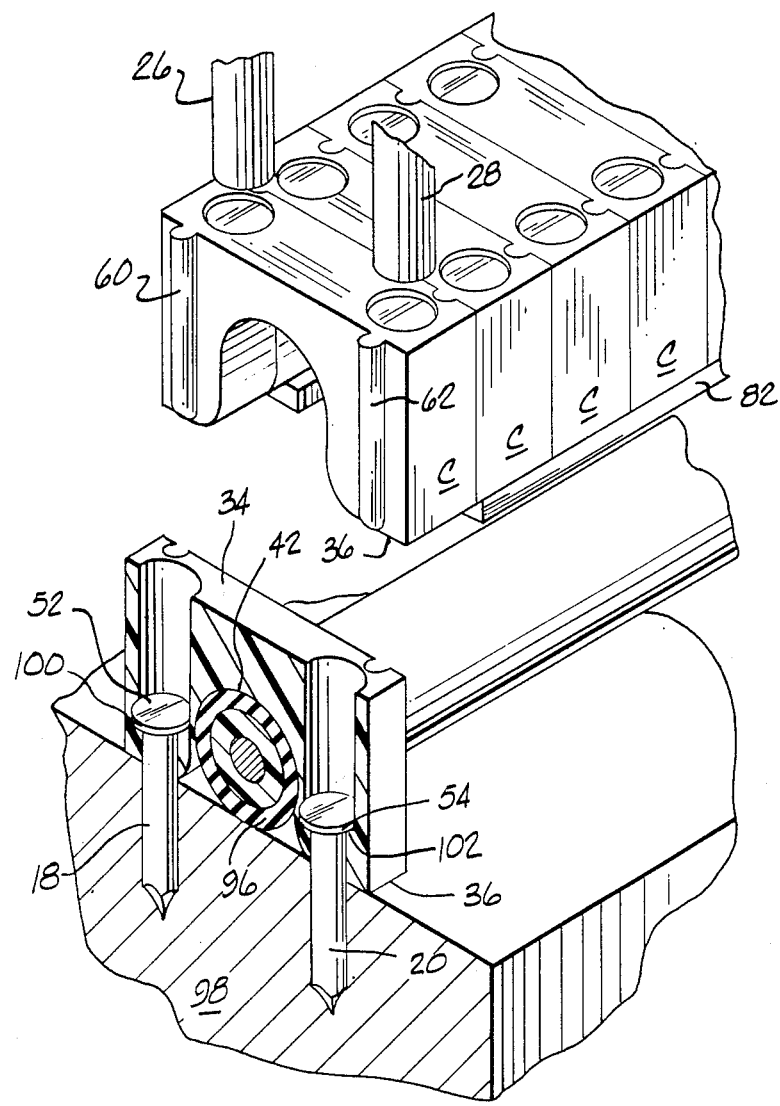
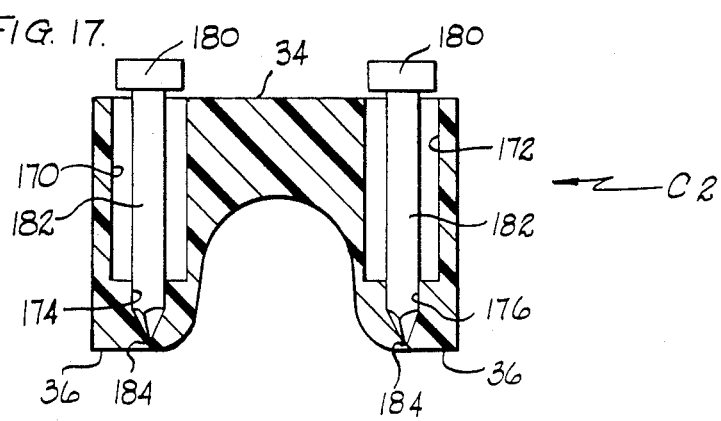

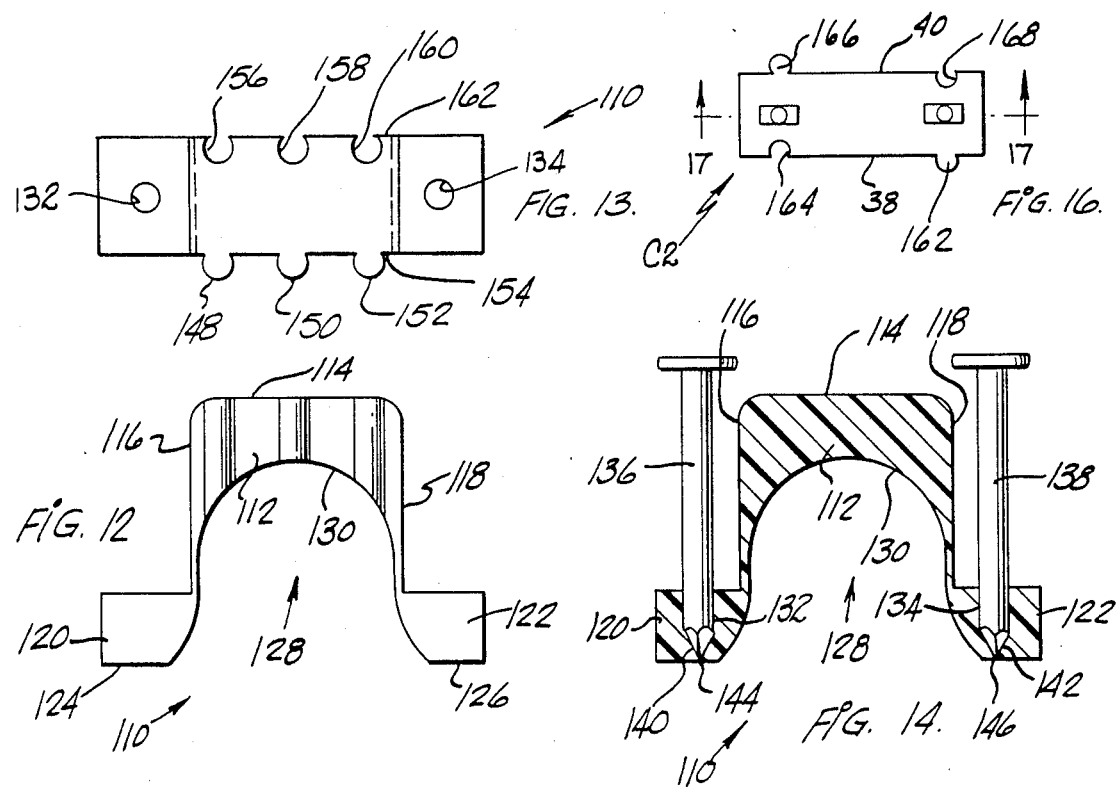
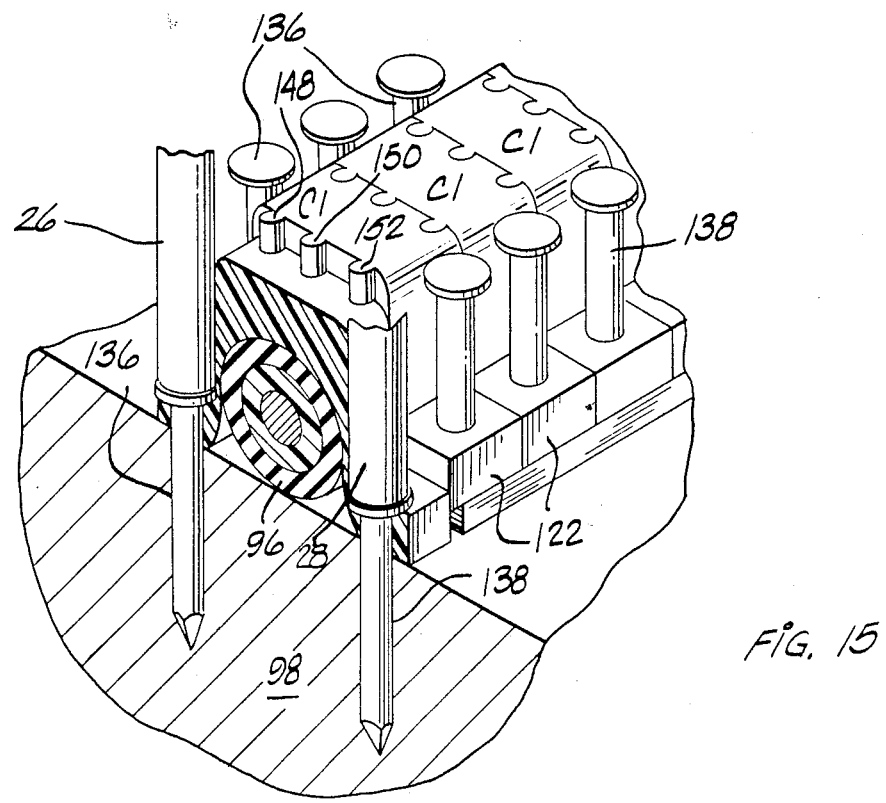

CABLE MOUNTING APPARATUS AND METHOD

This application is a continuation-in-part of U.S. patent application Ser. No. 740,802, filed June 3, 1985, and U.S. patent application Ser. No. 754,574 filed July 15, 1985.

FIELD OF THE INVENTION

This invention relates to the field of fastening cable to a surface and in particular to fastening sensitive signal conducting insulated cable to a surface.

BACKGROUND INFORMATION

A common part of installing electronic equipment is the fastening of cable, such as the cable used in the telecommunications industry, to a surface such as a wall, a floor, a baseboard or other similar surfaces. The recent expansion of the telecommunication industry has caused an increase in the amount of sensitive cable being fastened to surfaces and has made more acute the need for a tool that conveniently, effectively and safely attaches such cable to surfaces and has made more acute the need for a tool that conveniently, efficiently and safely attached such cable to a surface in a quick and efficient manner without damaging the cable.

Previous methods of fastening cable to a surface have made use of individual, manually applied clips or conventional staple guns. The use of manually applied clips to attach cable to a surface has proved to be time consuming and labor intensive, making this method economically unattractive. Attachment of cable by using a conventional staple gun is faster and more economical than use of clips, but it has been found that stapling may have a harmful effect on the cable, impairing its electrical characteristics and possibly creating safety concerns.

A conventional staple gun ejects a metal staple and often a point of the staple may lacerate the protective insulation as it passes next to the cable, or the force that must be utilized in this process may cause the cross member of the stable to crimp or cut through the insulating layer of the cable that houses the conducting wires. Thus the metal staple may cut the insulating layer thereby exposing the conducting wire and allowing moisture ingress, or it may crush the cable sufficiently to impair its ability to accurately transmit signals or it may actually sever one of the conducting wires. Furthermore, the amount of force imparted to the cable by the staple depends on the size of the cable against which it is coming into contact and the resistance offered by the surface into which the staple legs must penetrate. Therefore, a stapler with an ejection force appropriate to accommodate one cable size or one density of surface material may need adjustment before it can be safely used in another cable environment. The most common method presently in the installation of sensitive cable is by the use of individual, manually applied clips. The need exists to make the installation of cable faster and easier while substantially eliminating crushing or severing of the cable insulation or the conducting wires.

One solution to the problem is disclosed in a copending application that discloses apparatus that includes a dual magazine staple gun in which one magazine contains protective encasements for surrounding the cable to prevent problems associated with the scraping or the crushing of the cable by a staple. A conventional staple gun having a magazine with staples is modified by providing a second housing assembly adjacent the bottom surface of the conventional stapler and substantially parallel thereto. The second housing assembly comprises a base member having a longitudinal cutout in the bottom surface and having side walls defining a chamber. A number of encasements are disposed in the chamber. The encasements have a slot on their lower surfaces which, in conjunction with the surface onto which the cable is being fastened, forms a channel for holding the cable when the clip is affixed to the surface. The clip has a foot member disposed on each side of the slot with a hole penetrating each foot member. A plurality of encasements are detachably fixed to each other in parallel fashion and disposed in the housing assembly chamber so that the feet of the encasements contact the floor of the chamber. A biasing member such as a spring has one of its ends positioned against a cover for the housing assembly and is attached at its other end to an encasement moving mechanism. The biasing member urges the encasement moving mechanism and thus the encasements forward in the housing assembly so that an encasement underlies the forwardmost of the staples in the staple gun.

In operation the slot in the base member of the housing assembly is positioned over the cable. The staple gun trigger lever is activated so as to move the forwardmost staple in the staple gun downward so that the staple legs pass through the holes in the feet of the underlying encasement. The force of the ejected staple carries the encasement downward out of the staple gun so that the feet of the encasement contact the surface. The staple legs penetrate through the holes in the feet of the encasement into the surface to affix the encasement in an upright position. In this position, the slot in the underside of the encasement, in combination with the surface, defines a channel in which the cable lies. As a result, the encasement legs and cross member keep the staple spaced from the cable so that the cable is not contacted by the staple. In this manner of operation, substantially all of the momentum of the staple ejected from the staple gun is absorbed by the encasement and surface, rather than allowing the force of this momentum to be transmitted to the cable.

SUMMARY OF THE INVENTION

In general, the present invention provides a system and apparatus for rapid automated fastening of cable to a support surface by the use of a new and improved cable holding and attachment clip. The word, clip, as used in this application, comprises an insulated, protective housing that unitarily embodies surface penetrating fastening devices in such a manner so as to allow the clips to be positioned, discharged and applied in a uniform automated process. The invention also provides a new and improved applicator tool (gun-like stapling devices) which holds and positions a plurality of the clips to accurately, economically and safely fasten a cable to a support surface.

In a preferred embodiment of the invention, the insulated, protective housing of the clip is of a hexahedral configuration having parallel top and bottom surfaces, parallel side surfaces and parallel front and rear surfaces. A cable receiving and holding channel is provided in the bottom surface. A pair of spaced apart bore means extend through the protecting housing portion of the clip between the top and bottom surfaces. Each bore means have cylindrical sections of different diameters so as to form an internal shoulder. The smaller diameter cylindrical section terminates in a conical section and is located closer to the bottom surface of the housing than to the top surface. Surface penetrating fastening devices are mounted in the bore means with a portion of each device frictionally engaged in the smaller diameter conical-cylindrical section and the head of the device positioned in the larger diameter cylindrical section. Means are provided to hold adjacent clips in an assembled relationship. In a preferred embodiment of the invention, this holding means comprises interlocking ribs on one of the surfaces of the housing of a clip located within interlocking grooves in the opposing surfaces of the housing of an adjacent clip.

In another embodiment of the invention, a modified clip, which modified clip is not within the definition of the word, clip, set forth above, comprises a housing which is integrally molded using a suitable plastic material and has a cable receiving and holding channel provided in its bottom surface. The housing has a central portion and two legs each of which extend outwardly from the sides of the housing. Bore means extend through each of the legs. Surface penetrating fastening devices are mounted in the bore means with a portion of each surface penetrating fastening device frictionally engaged in the bore means.

In another embodiment of the invention, a modified clip, which modified clip is not within the definition of the word, clip set forth above, comprises an insulated, protective housing which is integrally molded using a suitable plastic material and has a cable receiving and holding channel provided in its bottom surface. The insulated, protective housing is of a hexahedral configuration having parallel top and bottom surfaces, parallel side surfaces and parallel top and bottom surfaces. A pair of spaced apart bore means extend through the insulated protective housing between the top and bottom surfaces. The upper portion of each bore means closer to the top surface is rectangular in cross-section and the lower portion of each bore means closer to the bottom surface is circular in cross-section. The surface penetrating fastening device is a T-nail having a head which is rectangular in cross-section and a shank that is cylindrical in cross-section. A T-nail is positioned in each bore means and is retained therein by frictional engagement between a portion of the shaft of the T-nail and the circular portion of the bore means. Either the upper portion or all of the head of the T-nail extends above the top surface of the insulated, protective housing or a portion of the shaft of the T-nail extends below the bottom surface of the insulated, protective housing An applicator tool is provided for positioning, ejecting and fastening a clip or a modified clip over a cable. This applicator tool operates similarly to a conventional stapling device. A multiplicity of clips are joined together and positioned in a feed track means. A spring biasing means acts on the multiplicity of clips to position the foremost clip above a discharge chute. The applicator tool is positioned over the cable and activated so as to drive a means into contact with portions of the surface penetrating fastening devices of the clip and substantially simultaneously move the clip downwardly until it is in a fastened position around the cable and is resting on the surface on which the cable is to be fastened. Repeated activations of the driving means of the applicator tool may be needed to adequately penetrate the surface so that the clip is properly fastened on the surface.

It is an object of this invention to provide apparatus and method for automatically fastening a cable in a desired location without damage to the cable.

It is another object of this invention to provide a clip for fastening a cable in a desired position wherein the surface penetrating fastening devices are positioned within the boundaries of the housing of the clip so that the clip may be automatically positioned, ejected and fastened around the cable.

It is a further object of this invention to provide a clip for fastening a cable in a desired position wherein the surface penetrating fastening devices are positioned within the boundaries of the housing of the clip so that the clip may be automatically positioned around the cable and be fastened to a supporting surface and wherein each clip is provided with means for holding adjacent clips in an assembled relationship.

It is another object of this invention to provide a modified clip for fastening a cable in a desired position wherein the surface penetrating fastening devices are positioned on the housing of the modified clip so that the modified clip may be automatically positioned around the cable and be fastened to a supporting surface and wherein each modified clip is provided with means for holding adjacent clips in an assembled relationship.

It is a further object of this invention to provide interlocking means on the surfaces of each slip so that adjacent clips may be interlocked together to form an assembled relationship to a multiplicity of clips without impairing the ability of the clips to move downwardly to a fastened position around the cable.

Many other objects and advantages of the present invention will become apparent from considering the following detailed description in connection with the drawings.

BRIEF DESCRIPTION OF THE DRAWINGS

FIG. 4 is a top plan view of FIG. 3 with the surface penetrating fastening devices removed;

FIG. 6 is a cross-sectional view of a portion of the applicator tool along the line 7—7 of FIG. 1;

FIG. 7 is a side elevational view with parts removed and parts in cross-section of a portion of the applicator tool having clips mounted therein;

FIG. 8–11 are pictorial views illustrating the clip during various stages of its application.

FIG. 12 is a front elevational view of a modified clip;

FIG. 13 is a top plan view of FIG. 12 with the surface penetrating devices removed;

FIG. 14 is a cross-sectional view along the lines 14—14 of FIG. 13;

FIG. 15 illustrates the clip of FIGS. 12-14 in use;

FIG. 16 is top plan view illustrating another modification of the clip;

FIG. 17 is an enlarged cross-sectional view along the line 17—17 of FIG. 16 with surface penetrating fastening devices positioned therein;

FIG. 18 is an enlarged cross-sectional view along the line 17—17 of FIG. 17 with surface penetrating fastening devices positioned therein;

FIG. 19 is an enlarged front elevational view of a surface penetrating fastening device for use in this invention;

FIG. 20 is a side elevational view of FIG. 19; and

FIG. 21 is a bottom plan view of FIG. 19.

DETAILED DESCRIPTION OF THE INVENTION

Figure 1:
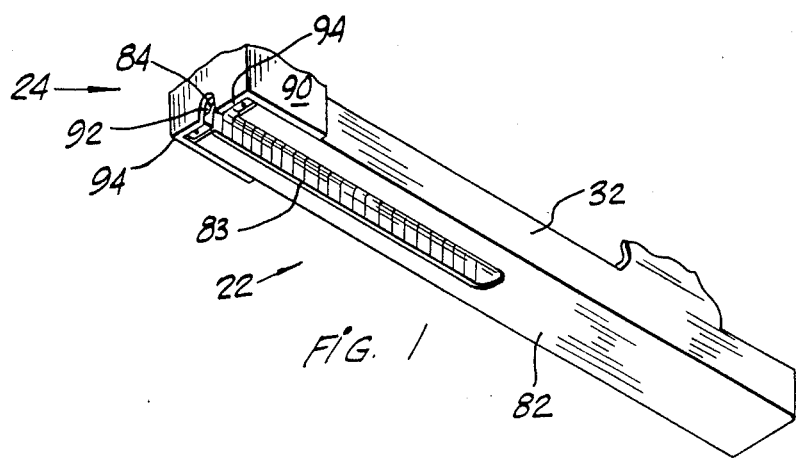
FIG. 1 is a pictorial view illustrating a portion of an applicator tool for use with this invention.
Figure 2:
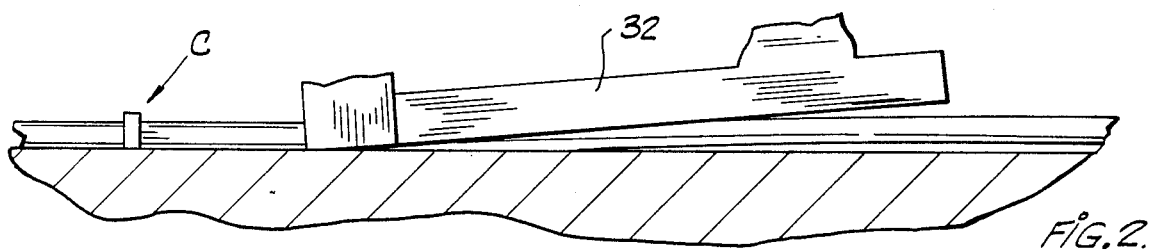
FIG. 2 is a side view of a portion of an applicator tool positioned over a cable.

In general, the clip C of the present invention comprises an insulated, protective housing 10 integrally molded using a plastic material and has a pair of bore means 12 and 14 located on opposite sides of a cable receiving channel means 16. The surface penetrating fastening devices in the preferred embodiment of the clip of this invention comprise a pair of nails 18 and 20 which are held and supported in a non-fastening position completely within bore means 12 and 14 prior to being driven into a support structure on opposite sides of a cable, such as a telecommunications cable, confined in channel means 16. It is understood that other types of fastening means may be used. The clip may be manufactured by forming the one piece clip member in situ about the nail members by an injection molding process or the like; or by a two-step assembly process whereby the nails are placed in the housing after the formation of the housing. A portion of an applicator tool 22 is illustrated in FIGS. 1 and 2 and comprises an elongated upper drive section 24 having a reciprocable means including a pair of hammer portions 26 and 28 illustrated in FIGS. 6 and 7. An elongated lower jaw section 32 provides a channel and guideway for slidably supporting a stack of the clips 10 which are held therein in adjacent abutting relationship for one by one sliding movement from a plurality of stored positions to a position in alignment with the hammer portions 26 and 28. The details of the applicator tool form no part of this invention, but it is understood that the applicator tool, except for modifications specifically described herein, will appear and function similar to conventional staple guns such as those manufactured by Duo-Fast.

The housing 10 comprises a block of suitable plastic material, such as polypropylene or polycarbonate, having a length, width and depth and in a preferred embodiment of the invention is a hexahedron having parallel side surfaces 30 and 32, parallel top and bottom surfaces 34 and 36, and parallel front and rear surfaces 38 and 40. It is to be understood that the housing block can be of other geometrical configurations. A central channel means 16 extends between the front and rear surfaces 38 and 40 and has an arcuate surface 42 with a radius of curvature approximately equal to the radius of curvature of a cable to be received therewithin. The channel means 16 also has outwardly curved terminal surface portions 44 and 46 to facilitate positioning over the cable means. The construction and arrangement is such as to enable the cable to fit completely in the channel means 16 with opposite parallel abutment surfaces of the bottom surface 36 located laterally beyond the outer periphery of the cable means so that when a clip is properly positioned over a cable and fastened to the supporting surface, a portion of the clip is in frictional abutting engagement with a portion of the cable, a portion of the cable is in frictional abutting engagement with a portion of the support surface and the bottom surface 36 of clip in contact with the supporting surface.

Figure 3:
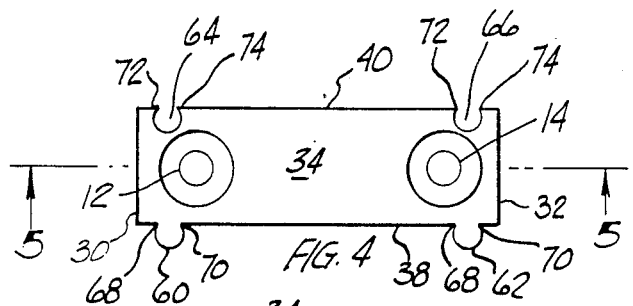
FIG. 3 is a front elevational view of a clip.
Figure 5:
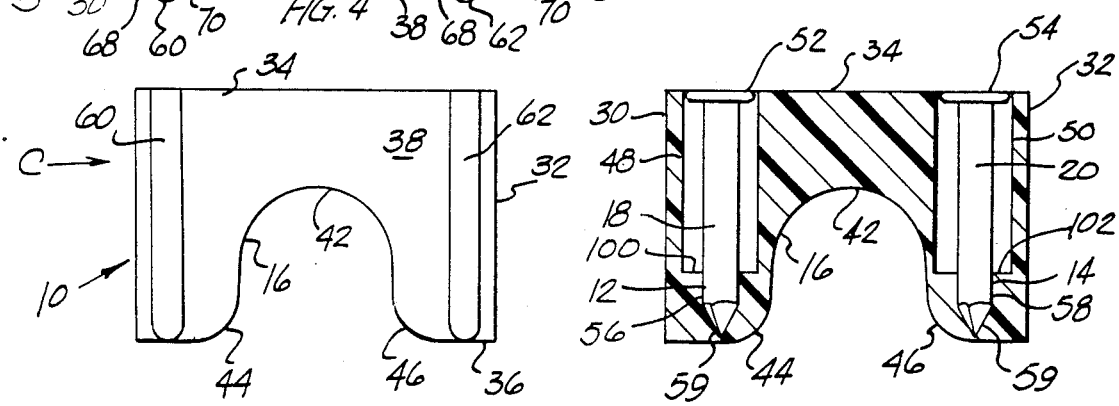
FIG. 5 is a cross-sectional view along the line 5—5 of FIG. 4 with surface penetrating fastening devices positioned therein.

Each of the bore means 12 and 14 is in the form of a counter bore having a first elongated relatively large diameter bore portion 48 and 50 and a second relatively short length and relatively small diameter portion, identified above and hereafter as 12 and 14. The diameter of bore portion 48 and 50 is slightly greater than the diameter of the head 52 and 54 of the nails 18 and 20. The diameter of bore portions 12 and 14 is slightly less than the diameter of nail shanks 56 and 58. This combination functions to locate the nails in proper position for contact by the hammer portions 26 and 28. As illustrated in FIG. 5, each of the shanks 56 and 58 has a surface penetrating portion having an axial length extending between the tips 56a and 58a and the dotted lines 56b and 58b that requires repeated applications of force, as explained below, until the clip C is completely fastened on the support surface. As illustrated in FIG. 3, a conical section 59 is provided in the bore portions 12 and 14 adjacent to the bottom surface 36 and is shaped so that the head of each shank may be positioned therein. The conical section 59 is joined at the bottom to seal the bore portions 12 and 14 to form a mass into which the points of the nails 18 and 20 can be embedded to provide an additional nail restraining means. Each nail 18 and 20 is temporarily held in its associated bore means by frictional engagement with circumjacent portions of the bores with both the heads and the shafts located completely within the peripheral confines of the housing 10 of the clip C. Thus, the clip can be packaged and handled like staples and used like staples in a staple-type applicator tool having drive hammer portions 26 and 28 which enter bore portions 48 and 50 to engage and drive the nails 18 and 20 into the support surface. If desired, the nails 18 and 20 can be of other configurations, such as a T-shaped head, the bore means can be of other configurations, such as to rectangular, and the hammer portions can be of other configurations, such as rectangular.

The housing 10 is provided with means so that one clip can be interlocked with an adjacent clip. The interlocking means comprises a pair of spaced apart ribs 60 and 62 projecting outwardly from the front surface 38 and a pair of spaced apart grooves 64 and 66 formed in the rear surface 40. It is understood that the interlocking means can comprise one or more ribs and one or more cooperating grooves. The interlocking ribs 60 and 62 are generally circular in cross-sectional configuration and have an arcuate peripheral surface extending for an arcuate distance of between about 185 degrees and 345 degrees so as to form notches 68 and 70 between the peripheral surfaces of the ribs 60 and 62 and the front surface 38. The interlocking grooves 64 and 66 are generally circular in cross-sectional configuration and have an arcuate surface extending for an arcuate distance of between about 185 degrees and 345 degrees with a slot entering into the interlocking grooves 64 and 66 so as to form resilient flange portions 72 and 74. Adjacent clips are interlocked by pushing the interlocking ribs 60 and 62 into the interlocking grooves 64 and 66 until the front surface 38 of one clip is in contact with the rear surface 40 of an adjacent clip. In the assembled relationship, the resilient flange portions 72 and 74 are seated in the notches 68 and 70 so as to hold the adjacent clips in the assembled relationship. While the interlocking grooves 64 and 66 have been described with arcuate surfaces, the grooves only have to have a cross-sectional area to accommodate the interlocking ribs and can be of any geometrical configuration as long as the appropriate flange portions 72 and 74 are provided.

The mounting of a multiplicity of clips C during the application of the clips is schematically illustrated in FIGS. 6 and 7. A multiplicity of clips C in assembled relationship have a longitudinal axis L and are positioned in multiple clip feed track means comprising vertical plates 76 and 78 and horizontal plates 80 and 82. The plates 80 and 82 have abutment surface means 80a and 82a for contacting the support surface 98, as explained below, and clip supporting surface means 80b and 82b for supporting clips C. Therefore, the plates 80 and 82 each have a thickness extending between the abutment surface means 80a and 82a and the clip supporting surface means 80b and 82b. The plate 82 is provided with a slot 83 so that when the applicator tool is positioned over a cable, a portion of the cable will extend through the slot 83 and be received in the cable receiving channel means 16 of the clip. This allows the clips C to be positioned only slightly above the support surface prior to being applied to the support surface. In some instances, the slot 83 extends for a distance less than half the length of the plate, but, if desired, the slot 83 can be longer and could extend for the full length of the plate 82. In this construction, the applicator tool can be parallel to the support surface rather than the angled relationship illustrated in FIG. 2. Spring means (not shown) urge the assembled clips into contact with the front wall 84 of the applicator tool 22. The front wall 84 is provided with a pair of grooves 86 for receiving the interlocking ribs 60 and 62 so that the front surface 38 is in contact with the surface 88 of the front wall 84. In the clip illustrated in FIGS. 3-5, the housing 10 is symmetrical so that, if the assembled clips are positioned backwards in the multiple clip feed track means, the rear surface 40 of each clip will contact the surface 88 and the hammer portions 26 and 28 will be aligned with the bore portions 48 and 50. An attachment 90 is located adjacent to the front wall 84 and is provided with a notch 92 and a supporting base 94. If desired, the attachment 90 is not used and the notch 92 is in the front wall 84. In any event, the front wall will have a notch mating with the notch 92. The distance between the notch 92 and the supporting base 92 is slightly greater than the diameter of the cable 96. The notch 92 is used with the slot 83 to properly align the applicator tool means 22 so that the clip C will be properly positioned relative to the cable 96.

As illustrated in FIGS. 7 and 8, the clip C in position A is ready to be applied over the cable 96. The spring means (not shown) is holding the front surface 38 against the surface 84 with the interlocking ribs 60 and 62 seated in grooves 86. When the applicator tool 22 is actuated, the hammer portions 26 and 28 will move downwardly into contact with the heads 52 and 54. The frictional force between the shafts 56 and 58 and the relatively small bore portions 12 and 14 is sufficiently great so that the clip C in position A will move relative to the clip C in position B in a downwardly direction. Movement of the clip in position B is prevented by the portions of the horizontal plate 82 on either side of the slot 83. The clip in position A will continue in the downward direction until the bottom surface 36 of the clip contacts the support surface 98. The cycle of operation during the application of a clip over a cable is explained below in relation to FIGS. 9-11.

Figure 9:
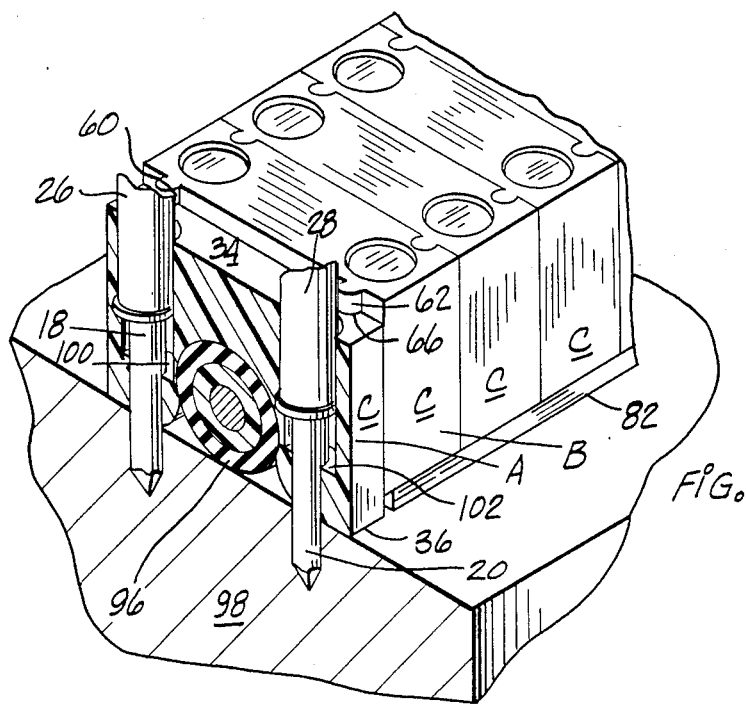
Figure 10:
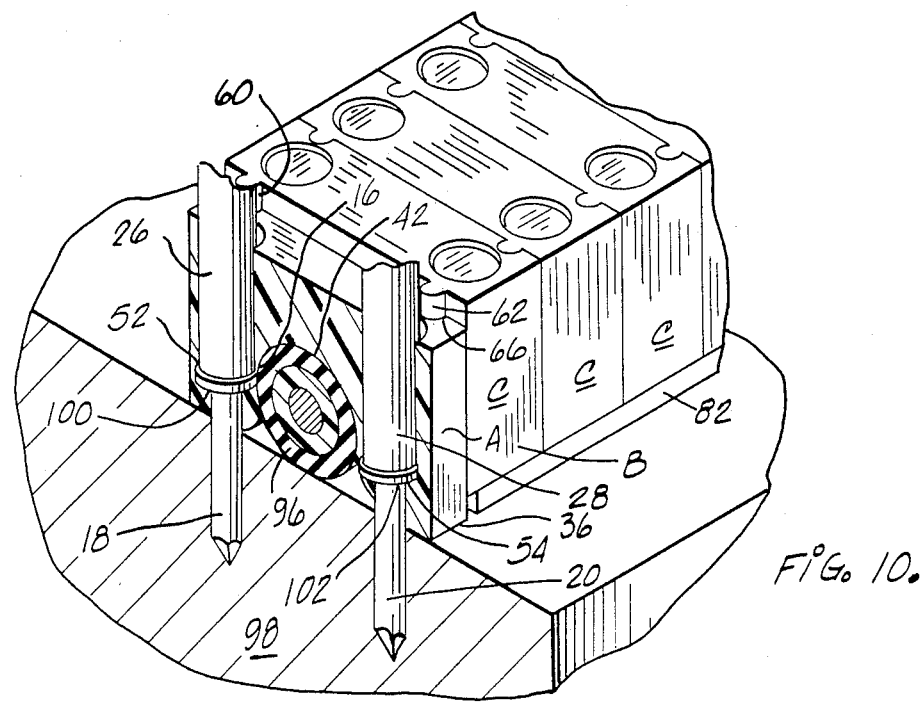

As illustrated in FIG. 9, the bottom surface 36 of the clip C is in contact with the support surface 98 and the driving force of the hammer portions 26 and 28 has driven the nails 18 and 20 downwardly into the surface 98 so that the heads 52 and 54 have moved about half way into the relatively large diameter bore portions 48 and 50 between the top surface 34 and the annular shoulders 100 and 102 formed at the junction of the relatively large diameter bore portions 48 and 50 and the relatively small diameter bore portions 12 and 14. The applicator tool device may continue to repeat the blows by the hammer portions 26 and 28 on the heads 52 and 54 of the nails 18 and 20 until the heads 52 and 54 are in contact with the annular shoulders 100 and 102 as illustrated in FIG. 10. As illustrated in FIGS. 8-11, the interlocking ribs 60 and 62 and the interlocking grooves 64 and 66 have a linear extent greater than the distance between the support surface 98 and the bottom surfaces 36 of the row of clips whereby the bottom surface 36 on the applied clip engages the support surface 98 before the interlocking ribs 60 and 62 are completely disengaged from the interlocking grooves 64 and 66 so that the force applying means of the applicator tool device may be repeatedly actuated until the clip in position A has been fastened onto the support surface. During the downward driving of the nails 18 and 20, and heads 52 and 54 thereof in cooperation with the sidewall of the bore portions 48 and 50 and the shafts 56 and 58 in cooperation with the bore portions 12 and 14 form spaced apart guide means to ensure that the heads 52 and 54 are properly positioned to be struck by the hammer portions 26 and 28.

As illustrated in FIG. 10, when the clip C is in its final applied position over the cable 96 so that the surface 42 is in contact with the peripheral surface of the cable 96, a portion of the interlocking ribs 60 and 62 on the clip C in position B is still in the interlocking relationship within the interlocking grooves 64 and 66 in the clip C in position A. The applicator tool device 22, as illustrated in FIG. 11, is moved in a vertical direction so as to slide the interlocking ribs 60 and 62 out of the interlocking grooves 64 and 66. The spring means (not shown) acts on the assembled clips C so that the clip C previously in position B now moves into position A.

The arcuate surface 42 of the channel means 16 is a semi-circle having a diameter slightly less than the diameter of the cable 96. The distance between the top of the arcuate surface 42 and the bottom surface 36 of the clip with nails 10 is also slightly less than the diameter of the cable 96. Therefore, when the clip C is in the applied position over the cable, there will be frictional forces beween the surface of the cable 96 in contact with the arcuate surface 42 and the surface of the cable 96 in contact with the support surface 98 so that relative movement between the cable 96, the clip C and the support surface 98 is resisted.

In one embodiment of the invention, the clip has a housing 10 which is integrally molded from a polypropylene material and has a length between the side portions 30 and 32 of about 0.590 inch; a width between the front 38 and rear 40 surfaces of about 0.180 inch; and a depth between the top 34 and bottom surfaces of about 0.400 inch. The large bore portions 48 and 50 have internal diameter of about 0.115 inch and the small bore portions have diameters of about 0.0475 inch. Each of the nails 18 and 20 has a length of about 0.400 inch with the diameter of the head being about 0.110 inch and the diameter of the shank being about 0.0475 inch. The arcuate surface 42 has a diameter of about 0.265 inch. This clip is suitable for use with a cable having an outer diameter of about 0.265 inch.

In the embodiment of the modified clip C 1 illustrated in FIGS. 12-15, the housing 110 comprises a central portion 112 having a top surface 114 and side surfaces 116 and 118. Extending outwardly from the side surfaces 116 and 118 are legs 120 and 122 having bottom surfaces 124 and 126. The central portion 112 is provided with a cable receiving channel means 128 and has an arcuate surface 130 having a radius of curvature approximately equal to the radius of curvature of a cable to be received therewithin. The construction of the cable receiving channel means 128 is the same as the cable receiving channel means 16.

Bore means 132 and 134 are provided in the legs 120 and 122. Nails 136 and 138 are positioned in the bore means 132 and 134 and are retained therein by a frictional engagement between the surfaces of the bore means and the surfaces of the shafts of the nails. As illustrated in FIG. 14, the bore means 132 and 134 are similar to bore portions 12 and 14 in that a conical section 140 and 142 may be provided adjacent to the bottom surfaces 144 and 146 of the legs 120 and 122. Each of the conical sections 140 and 142 is provided with a mass of plastic material 144 and 146 adjacent to the bottom surfaces into which mass the points of the nails 136 and 138 are embedded to provide an additional nail retaining means. Although the heads of the nails 136 and 138 are located above the plane of the top surface 114 of the central portion 112, it is understood that other sizes of nails may be used within the scope of the invention.

The housing 110 is provided with interlocking means so that one modified clip can be interlocked with an adjacent modified clip which interlocking means correspond to the interlocking means described above. The interlocking means comprise spaced apart ribs 148, 150 and 152 on the front surface 154 of the central portion 112 and spaced apart grooves 156, 158 and 160 formed in the rear surface 162 of the central portion 112 which ribs and grooves have the same structure and function as the ribs 60 and 62 and the grooves 64 and 66.

The cycle of operation during the application of a modified clip C 1 over a cable is the same as that described above in relation to a clip C and illustrated in FIGS. 8–11. FIG. 15, which is similar to FIG. 10, shows a modified clip C1 that has just been fastened to the surface 98 and is still attached to an adjacent modified clip C 1.

In FIG. 16, there is illustrated another embodiment of the invention wherein the front surface 38 of the clip C 2 has one interlocking rib 162 and one interlocking groove 16 and the rear surface 40 has one interlocking rib 166 and one interlocking rib 168. As illustrated in FIG. 16, the interlocking ribs and grooves are located so that adjacent housings may be interlocked with two front surfaces in contact, two rear surfaces in contact or a front and a rear surface in contact. It is understood that other arrangements of the interlocking ribs and grooves are within the scope of the invention.

The bore means illustrated in FIGS. 16–18 have upper portions 170 and 172 having a transverse cross-sectional configuration that is rectangular and lower portions 174 and 176 have a transverse cross-sectional configuration that is circular. A surface penetrating fastening device for use in the modification of the invention illustrated in FIGS. 16–18 comprises as T-nail 178 that is illustrated in FIGS. 19– 21. The T-nail 178 has a head 180 having a transverse cross-sectional configuration that is rectangular and only slighty smaller than the transverse cross-sectional configuration of each of the upper portions 170 and 172 of the bore means. The shaft 182 of the T-nail 178 has a transverse cross-sectional configuration which is circular and has a diameter slightly greater than the diameter of the lower portions 174 and 176 of the bore means to provide for a frictional fit therebetween.

The modifications of the invention illustrated in FIGS. 17 and 18 are useful when the installation conditions require the use of surface penetrating fastening devices having a length greater than the length of the bore means. In FIG. 17, the tip 184 of the shaft 182 is located in the same position as illustrated in FIGS. 5 and 14 but the head 18 is above the top surface 34. The distance that the head 180 is above the top surface 34 depends on the required length of the surface penetrating fastening device. In FIG. 18, the head 180 is within each of the upper portions 170 and 172 of the bore means and the tip 184 of the shaft 182 is below the bottom surfaces 36 of the clip. The distance that the tip 184 is below the bottom surface 36 depends on the required length of the surface penetrating fastening device. If desired, the head 180 can be above the top surface 34 and the tip 184 below the bottom surface 36.

The cycle of operation during the application of a modified clip C2 over a cable is the same as that described above in relation to clip C and illustrated in FIGS. 8–11. During the driving of the T-nails 178, the head 180 thereof in cooperation with the sidewall of an associated upper portion 170 or 172 and the shaft 182 in cooperation with the sidewall of an associated lower portion 174 or 176 from spaced apart guide means to ensure that the head 180 is properly positioned to be struck by the hammer portions 26 and 28.

It is contemplated that the inventive concepts herein described may be variously otherwise embodied and it is intended that the appended claims be construed to include alternative embodiments of the invention except insofar as limited by the prior art.

What is claimed is:

1. An assembly of mounting devices for use in an applicator tool for attaching an elongated object such as a cable to a support surface comprising:

a plurality of individual mounting devices mounted in abutting relationship to provide an elongted row of mounting devices having a longitudinal axis extending therethrough;

each of said mounting devices having a plurality of surfaces including at least top and bottom surfaces, two opposite side surfaces and front and rear surfaces;

each of said mounting devices having elongated object receiving channel means in said bottom surface for receiving a portion of said elongated object;

each of said mounting devices having at least one bore means extending therethrough and having an opening in said bottom surface;

a surface penetrating fastening device having at least a portion thereof located in said at least one bore means;

each of said mounting devices having interlocking means comprising at least one interlocking rib portion on one of said surfaces and at least one interlocking groove portion in another of said surfaces;

each of said mounting devices having its interlocking rib located rib located in the interlocking groove of an adjacent one of said mounting devices to form an interlocking relationship between adjacent mounting devices; and said interlocking relationship restraining movement between said adjacent mounting devices in one direction while permitting relative guided movement between said adjacent mounting devices in another direction until one of said adjacent mounting devices has been fastened to said support surface.

2. An assembly of mounting devices as in claim 1 and further comprising:
at least a portion of said surface penetrating fastening device located outside of said at least one bore means.

3. An assembly of mounting devices as in claim 2 wherein:
said interlocking rib portion has a generally circular cross-sectional configuration of more than 180 degrees and a stem portion connected to said one surface; and
said interlocking groove portion has a cross-sectional configuration larger than the cross-sectional configuration of said interlocking rib portion with a pair of resilient flange portions defining an elongated slot for retaining engagement with said interlocking rib portion within said interlocking groove portion to restrain movement in said one direction and for permitting relative guided movement in said another direction.

4. An assembly of mounting devices as in claim 2 in combination with an applicator tool device which comprises:
multiple mounting device feed track means for supporting said row of mounting devices in said abutting relationship so that each mounting device may be moved from a storage position to a single mounting device application position, along a linear path of movement;
a single mounting device application chamber means at one end of said feed means for receiving and confining one of said mounting devices in parallel alignment with said row of mounting devices;
means for moving said one of said mounting devices into said single mounting device application chamber means;
a single mounting device discharge chute means associated with said application chamber means for enabling movement of said one of said mounting devices from the application position to an applied position;
abutment surface means on the applicator tool device for abutting engagement with the support surface on which said one of said mounting devices is to be fastened;
said one of said mounting devices in said single mounting device application chamber means having said bottom surface thereof facing said support surface;
force applying means in said applicator tool;
said interlocking means being constructed and arranged to hold said one of said mounting devices in said single mounting device application chamber means in alignment with said row of mounting devices until the application of a force thereto; and
said interlocking means having a linear extent greater than the distance between said support surface and the bottom surfaces of said row of mounting devices when said applicator tool is in position over said elongated object on said support surface whereby said bottom surface on said one of said mounting devices engages said support surface before the interlocking means are completely disengaged so that the force applying means of the applicator tool device may be repeatedly actuated until said one of said mounting devices has been fastened onto the support surface.

5. An assembly of mounting devices as in claim 2 wherein said interlocking means comprises:
an interlocking rib and an interlocking groove located on said front surfaces; and
an interlocking rib and an interlocking groove located on said rear surfaces.

6. An assembly of mounting devices as in claim 2 and further comprising:
each of said mounting devices having a length extending between said front and rear surfaces, a width extending between said opposite side surfaces and a depth extending between said top and bottom surfaces; and
wherein said interlocking means have a linear extent equal to said depth of said mounting device.

7. An assembly of mounting devices as in claim 2 wherein said at least one bore means comprises:
at least two bore means extending through said mounting device and having an opening in said bottom surface on each side of said elongated object receiving channel means; and
surface penetrating fastening devices having at least a portion thereof located in each of said bore means and a portion thereof located outside of each of said bore means.

8. An assembly of mounting devices as in claim 7 and further comprising:
each of said bore means having an upper portion and a lower portion with a shoulder formed at the junction of said upper and lower portion; and
each of said surface penetrating fastening devices having an enlarged head portion for contacting said shoulder to hold said housing to said support surface.

9. An assembly of mounting devices as in claim 8 wherein said interlocking means comprise:
an interlocking rib and an interlocking groove located on said front surfaces; and
an interlocking rib and an interlocking groove located on said rear surfaces.

10. An assembly of mounting devices as in claim 9 and further comprising:
each of said mounting devices having a length extending between said front and rear surfaces, a width extending between said opposite side surfaces and a depth extending between said top and bottom surfaces; and
wherein said interlocking means have a linear extent equal to said depth of said mounting devices.

11. An assembly of mounting devices as in claim 9 in combination with an applicator tool device which comprises:
multiple mounting device feed track means for supporting said row of mounting devices in said abutting relationship so that each mounting device may be moved from a storage position to a single mounting device application position, along a linear path of movement;
a single mounting device application chamber means at one end of said feed means for receiving and confining one of said mounting devices in parallel alignment with said row of mounting devices;

means for moving said one of said mounting devices into said single mounting device application chamber means;

a single mounting device discharge chute means associated with said application chamber means for enabling movement of said one of said mounting devices from the application position to an applied position;

abutment surface means on the applicator tool device for abutting engagement with the support surface on which said one of said mounting devices is to be fastened;

said one of said mounting devices in said single mounting device application chamber means having said bottom surface thereof facing said support surface;

force applying means in said applicator tool;

said interlocking means being constructed and arranged to hold said one of said mounting devices in said single mounting device application chamber means in alignment with said row of mounting devices until the application of a force thereto; and said interlocking means having a linear extent greater than the distance between said support surface and the bottom surfaces of said row of mounting devices when said applicator tool is in position over said elongated object on said support surface whereby said bottom surface on said one of said mounting devices engages said support surface before the interlocking means are completely disengaged so that the force applying means of the applicator tool device may be repeatedly actuated until said one of said mounting devices has been fastened onto the support surface.

12. An assembly of mounting devices as in claim 7 wherein:

said top surface has a central portion and two side portions;

each of said bore means having an opening in one of said side portions;

a plurality of interlocking rib portions located on said front surface; and a plurality of interlocking groove portions located on said back surface.

13. An assembly as in claim 12 wherein:

said interlocking rib portions and said interlocking groove portions extend between said central portion and portions of said elongated object receiving channel means.

14. An assembly of mounting devices as in claim 8 and further comprising:

each of said surface penetrating fastening devices having a length greater than the length of each of said bore means between said top and bottom surfaces;

each of said surface penetrating fastening devices having a head portion and a shank portion;

said head portion having a transverse cross-sectional configuration that is greater than the transverse cross-sectional configuration of said shank portion;

said transverse cross-sectional configuration of said head portion is slightly less than said transverse cross-sectional configuration of said upper portion of said bore means; and a portion of said shank portion is in frictional engagement with said lower portion of said bore means.

15. An assembly of mounting devices as in claim 14 and further comprising:

said transverse cross-sectional configuration of said upper portion of said bore means is rectangular; and said transverse cross-sectional configuration of said head portion is rectangular.

16. An assembly of mounting devices as in claim 15 and further comprising:

said head portion is located completely in said upper portion of said bore means; and at least a portion of said shank portion extends below said bottom surface.

17. A method of fastening an elongated object such as a cable to a support surface comprising:

providing a plurality of mounting devices each having at least top and bottom surfaces, two side surfaces and front and rear surfaces and at least a pair of spaced apart bore means extending therethrough between said top and bottom surfaces;

providing elongated object receiving channel means in said bottom surface between said spaced apart bore means;

locating at least a portion of a surface penetrating fastening device in each of said bore means so that at least a portion of said surface penetrating fastening device is located within each of said bore means;

temporarily retaining each of said surface penetrating fastening devices in said bore means for storage and handling prior to use in fastening said elongated object to said support surface;

interlocking a portion of one of said mounting devices with a portion of an adjacent one of said mounting devices to restrain movement therebetween in one direction but to permit relative guided movement therebetween in a direction pependicular to said one direction while holding said mounting devices in an assembled relationship;

placing said mounting devices in said assembled relationship into an applicator tool and positioning said applicator tool over said elongated object;

applying a force to said surface penetrating fastening devices in said one of said mounting devices to move said one of said mounting devices into a position over said elongated object;

maintaining said interlocking relationship between said one of said mounting devices and said adjacent one of said mounting devices during repeated applications of said force until said one of said mounting devices has been fastened to said support surface; and moving said adjacent one of said mounting devices relative to said one of said mounting devices to disengage said interlocking relationship.

18. A method as in claim 17 and further comprising:

locating at least a portion of said surface penetrating devices outside of each of said bore means.

* * * * *